United States Patent
Fourgeot (10) Patent No.: US 11,611,065 B2
(45) Date of Patent: Mar. 21, 2023

(54) SECONDARY ALKALINE ELECTROCHEMICAL CELLS WITH ZINC ANODE

(71) Applicant: SUNERGY, Rosny-sous-Bois (FR)

(72) Inventor: Fabrice Fourgeot, Fontenay-sous-Bois (FR)

(73) Assignee: SUNERGY, Rosny-sous-Bois (FR)

(\*) Notice: Subject to any disclaimer, the term of this patent is extended or adjusted under 35 U.S.C. 154(b) by 135 days.

(21) Appl. No.: 16/943,235

(22) Filed: Jul. 30, 2020

(65) Prior Publication Data

US 2021/0043921 A1    Feb. 11, 2021

(30) Foreign Application Priority Data

Aug. 9, 2019 (FR) ...................... 1909115

(51) Int. Cl.
| | | |
|---|---|---|
| *H01M 4/24* | (2006.01) | |
| *H01M 4/136* | (2010.01) | |
| *H01M 4/42* | (2006.01) | |
| *H01M 4/583* | (2010.01) | |
| *H01M 10/26* | (2006.01) | |
| *H01M 4/62* | (2006.01) | |
| *H01M 4/02* | (2006.01) | |

(52) U.S. Cl.
CPC .......... *H01M 4/244* (2013.01); *H01M 4/136* (2013.01); *H01M 4/42* (2013.01); *H01M 4/583* (2013.01); *H01M 4/62* (2013.01); *H01M 10/26* (2013.01); *H01M 2004/027* (2013.01); *H01M 2300/0014* (2013.01)

(58) Field of Classification Search
None
See application file for complete search history.

(56) References Cited

U.S. PATENT DOCUMENTS

| | | | |
|---|---|---|---|
| 858,862 | A | 7/1907 | Edison |
| 3,466,195 | A | 9/1969 | Spellman et al. |
| 4,147,839 | A | 4/1979 | Solomon et al. |
| 5,006,424 | A | 4/1991 | Evans et al. |
| 5,215,836 | A | 6/1993 | Eisenberg |
| 5,556,720 | A | 9/1996 | Charkey |
| 6,649,305 | B1 | 11/2003 | Bugnet et al. |
| 2004/0166412 | A1 | 8/2004 | Bugnet et al. |

FOREIGN PATENT DOCUMENTS

| | | | |
|---|---|---|---|
| CN | 103794824 A | | 5/2014 |
| EP | 0423385 A1 | | 4/1991 |
| EP | 1 819 002 | \* | 8/2007 |
| EP | 1819002 A2 | | 8/2007 |
| FR | 2 788 887 | \* | 7/2000 |
| GB | 1411911 A | | 10/1975 |

OTHER PUBLICATIONS

Alekseeva et al., Distribution of active components in nickel-zinc battery, Russian Journal of Applied Chemistry, vol. 70, No. 1, 1997, pp. 68-72.
Briggs et al., Concentrated potassium zincate solutions studied using laser Raman spectroscopy and potentiometry, Department of Chemistry, Loughborough Univ. of Technology, Loughborough, Leics, Apr. 10, 1974, 1978-1990.
Foller, Improved slurry zinc/air systems as batteries for urban vehicle propulsion, Journal of Applied Electrochemistry vol. 16, pp. 527-543 (1986).
Huot, The effects of silicate ion on the corrosion of zinc powder in alkaline solutions, Journal of Applied Electrochemistry vol. 22, pp. 443-447 (1992).
Marshall et al., The effect of potassium silicate on the dissolution of zinc in alkali, Surface Technology, vol. 5, Issue 2, Mar. 1977, pp. 149-161.

\* cited by examiner

*Primary Examiner* — Laura Weiner
(74) *Attorney, Agent, or Firm* — Michael J. Blessent; Bret E. Field; Bozicevic, Field & Francis LLP (57) ABSTRACT

The invention relates to the field of alkaline electrochemical cells and more specifically to that of batteries.
More specifically, the invention pertains to a secondary electrochemical cell with a zinc electrode, which is differentiated in that it comprises:
a) an electrolyte which is an alkaline aqueous solution whose molarity is between 4 M and 15 M hydroxyl anions, comprising soluble silicates whose concentration expressed as silica ($SiO_2$) is between 0.15 g/l and 80 g/l; and
b) a zinc electrode containing a conductive ceramic at least partly consisting of
hafnium nitride and/or carbide and/or magnesium carbide and/or nitride and/or silicide and/or niobium carbide and/or nitride and/or titanium carbide and/or nitride and/or silicide and/or vanadium nitride acid/or
of double carbides and/or nitrides of any two metals selected among hafnium, magnesium, niobium, titanium and vanadium.

8 Claims, 4 Drawing Sheets

SECONDARY ALKALINE ELECTROCHEMICAL CELLS WITH ZINC ANODE

This invention pertains to the field of alkaline electrochemical cells and more specifically to that of batteries.

It especially concerns secondary cells with zinc anode such as nickel-zinc, zinc-manganese dioxide, silver-zinc, zinc-air, as well as those having a totally soluble or partially soluble cathode such as zinc-iodine, zinc-bromine, zinc-ferricyanide, Zn-manganese oxide and is intended to obtain a high number of cycles from the zinc electrode.

State of the art

The energy characteristics of zinc (820 Ah/kg, 5845 Ah/l), its electronegativity (1.65V), its low cost and its ease of recycling make it a particularly interesting material for electrochemical cell anodes: thus, the theoretical mass energies of the nickel-zinc and zinc-air pairs are 334 Wh/kg and 1,320 Wh/kg respectively. In practice, the mass energy of nickel-zinc batteries can go up to 80 Wh/kg in prismatic format, which is two to three times that of lead batteries.

However, while zinc is used extensively in alkaline batteries and Leclanché® batteries, it is absent from industrial alkaline batteries, with the exception of silver-zinc batteries, which are used for only a few cycles and are mainly used for military applications, and more recently in the first industrial nickel-zinc batteries.

Zinc is soluble in an alkaline medium in the form of zincates and, when zinc anode batteries are charged, it easily forms dendritic growths which cause short circuits between electrodes of opposite polarity.

In addition, the negative electrode areas, where zinc is deposited, evolve during the charging and discharging cycles: thus, one observes densification phenomena which reduce the porosity of the electrode and consequently its ability to operate at the current densities corresponding to the practical use of the batteries. Other factors hamper the zinc anode, such as the precipitation of zinc oxide which forms a layer that is passive and reduces the active surface of the electrode.

Much work has been done to understand the mechanisms of zinc deposition and dissolution in alkaline media and a large number of patents have been filed proposing various solutions:

- the subject of most of the patents is the use of additives added to the electrolyte or incorporated into the anodic active ingredient, with the aim of reducing the solubility of zincates;
- mechanical processes are also described which make it possible to circulate the electrolyte alone or a zinc electrode dispersed in the electrolyte, in order to avoid dendritic growths by ensuring a homogeneous zinc deposit;
- the use of pulsed currents, with or without polarity inversion, which help in at least partially dissolving the dendrites;
- finally, the use of separators that limit the formation or suppress the diffusion of zincate ions from the anode to the cathode: these are, for example, multilayer microporous separators or exchange membranes.

These various techniques can be used alone or in combination, but they only provide part of the solution and, depending on the case, increase the internal resistance, increase the cost of the battery, or are complex to implement. Furthermore, some recommend the addition of lead or cadmium to the active mass of the anode, which is hardly acceptable for obvious reasons of pollution.

Progress has been made by adding additives to the electrolyte comprising mainly of potash, as is the case with the small cylindrical nickel-zinc (NiZn) batteries available in the market. Nevertheless, the obtained number of cycles does not meet the usage needs of industrial batteries, which must at least ensure 1,000 deep charge and discharge cycles, corresponding to 80% depth of discharge and higher.

Figure 3:
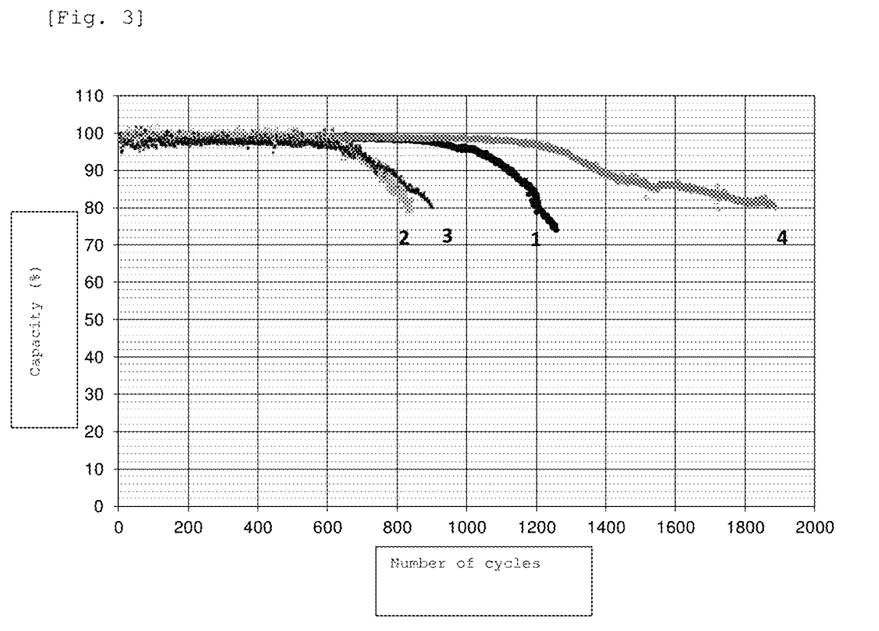

Singular advance has been made by adding conductive ceramics, preferably titanium nitride (TiN), to the zinc electrode, an innovation described in patent FR 2 788 887 (SCPS) of 27 Jan. 1999, which makes it possible to exceed 1,000 cycles at 80% depth of discharge and beyond, as shown by element 1 in FIG. 3. Loss of capacity of NiZn batteries during the cycling process is mainly correlated on the one hand to the local redistribution and densification of the active substance and on the other hand to the drying and consequently to the passivation of the zinc electrodes. This invention aims to provide a new response to the limits of possibility of the zinc electrode containing a conductive ceramic to provide a large number of cycles, a response which is provided by modifying the recombination conditions of the oxygen at the zinc's surface, i.e. by considerably slowing down the effects of passivation of zinc at the surface of the anode and of the drying of the cell, while maintaining the suppression of formation of dendrites and reduction of the redistribution and densification of zinc.

For this purpose, in a quite remarkable manner and in opposition to the observations previously described, the author of the present invention has shown that silicates added to an alkaline electrolyte, when applied to a cell comprising such an anode, makes it possible to greatly reduce the passivation phenomena of the zinc electrodes and drying out of the cell, and consequently to increase the cycling life of the system.

Examination of the state of the art of zinc anode systems shows that there are several patents and studies mentioning the use of silicates. According to these documents, the addition of silicates gives very different results if the electrolyte is used in small and non-mobile quantities, or in large quantities and/or during motion/circulation in the cell.

The addition of silicates has been known for a very long time, as demonstrated by Thomas Edison's U.S. Pat. No. 858,862 of Jul. 2, 1907 relating to the Lalande system (ZnCuO) which describes increased dissolution of zinc for an electrolyte containing silicates.

U.S. Pat. No. 3,466,195 A (ESB Inc.) issued on 9 Sep. 1969, mentions an increase in the initial capacity and the capacity's stability during storage or calendar life of the primary ZnAgO or $ZnMnO_2$ systems for a relatively small addition of 0.05% silicates in the electrolyte or positive electrode. It is pointed out by the authors of this patent that silicates have the disadvantage of increasing the impedance and that consequently the quantity of silicates in the electrolyte should be maintained at the minimum quantity necessary to induce the desired improvement. This patent also indicates a negative effect for silicate additions of 3%.

Marshall et al. (Surface technology 5 (1977) 149-163) studied the influence of potassium silicate on the reaction of dissolving polycrystalline zinc in a potassium hydroxide solution. Evidence is presented confirming the conclusions that potassium silicate is highly adsorbed in metallic zinc at near-dissolution potentials. This results in inhibiting the dissolution of zinc because the interaction of $OH^-$ with the metal surface is restricted. The adsorbed silicate layer also affects the movement of ionic species in the immediate vicinity of the electrode's surface. The amount of charge required to cause passivation is then reduced, thus indicating that the silicates promote passivation of zinc.

In patent EP 1 819 002 A2 (Powergenix System Inc.) dated 15 Aug. 2007, it is also mentioned that silicate may limit the solubility of zinc.

The patent CN 103794824B B (Hunan science and technology res and dev) dated 20 Jan. 2016 mentions the preparation of an electrolyte gel of KOH 5.5-6.5 mol/l characterised by the addition of silicates based on a mass ratio of 0.3-0.5:1 to solve the problems of nickel-zinc cell cycling. It also mentions that this gel reduces the formation of dendrites and the dissolution of a zinc electrode plate, the latter being in line with the study by Marshall et al. The silicate is added from lithium magnesium silicate or aluminium magnesium silicate which results in the formation of a gel characterised by silicate particles of 10-200 nm. The silicate concentration is therefore lower and unspecified as the electrolyte is the result of partial dissolution of solid silicate particles.

In the patent FR 2 630 862 (Sorapec SA) published on 3 Nov. 1989, it is mentioned that between 1% and 5% silicates are added to an 8M KOH electrolyte. The electrolyte is in abundant quantity, such that in the oxidised state (complete discharge of zinc), the zinc in the electrolyte is found mostly in the form of zincates. The beneficial effect of silicate in some energy storage applications is a phenomenon of greater dissolution of zinc in the form of zincates, which is the case of patent EN 2 630 862 above, but also of the zinc-air circulation systems, given below. It is mainly used in zinc-air systems with electrolyte circulation or zinc electrode circulation in dispersed form in the electrolyte, in order to increase the amount of zinc dissolved in the alkaline electrolyte, which is necessary to increase the mass and volume energies of the system.

In fact, A. Gordon Briggs et al. (J. Chem. Soc., Faraday Trans. 2, 1974, 70) show that the addition of potassium silicate at a rate of 0.15 mol/l (equivalent to 9 g/l of silica) makes it possible to dissolve 30% more zinc than in the absence of silicate by electrochemical means in a 10 mol/l potash solution. They also observe that the stability of supersaturated solutions over time (i.e. the absence of zinc oxide precipitation) is much greater in the presence of silicate.

P. C. Foller (J. Appl. Electrochem. 16, 1986, 527) describes a zinc-air system using a dispersed zinc electrode. 25 g/l to 28 g/l of silica are used in a 12 mol/l potash solution. In the presence of silicate, the zinc discharge time for the same volume of electrolyte is doubled, which here again corresponds to an effect of increasing the solubility of the zinc. It is interesting to note that in 1907 Thomas Edison already reported this same multiplication by 2. The silicate-free solution presents a white precipitate of zinc oxide, whereas the solution with silicate has a dark colour, which according to the author is related to the formation of a quasi-colloid. At 30 g/l of silica, the effect of silicates becomes negative due to a high increase in viscosity and which, after the deposit of silica, passivates the surface of the zinc, thus reducing the quantity discharged. The same electrolyte composition is also used in patent U.S. Pat. No. 5,006,424 (Univ California) of 9 Apr. 1991 for a Zinc-Air battery with a bed of zinc particles. In the same vein, the patent FR 2 214 977 (Shell Int Research) of 19 Aug. 1974, mentions that in order to increase the amount of zincate ion which can dissolve in caustic electrolyte solutions between 5 and 7 mol/l before zinc oxide starts to precipitate, silicate ions could be added to the electrolyte solutions. This patent claims an electrolyte 2 to 4.75 mol/l KOH and 9 to 36 ions-grams/l or 5.86-23.5 g/l $SiO_2$. The authors mention that this electrolyte limits the passivation of the zinc electrode for primary systems. For secondary cells, which in particular use microporous electrodes, it is proposed to trap zinc oxide in the pores of the electrode, which then resists dendritic growth and shape variations during recharging, thus improving its lifespan. Systems that use metallic zinc as an electrode in the form of a suspension in the electrolyte, passivation is delayed or prevented. It is mentioned that silicate ion concentrations above 23 ions-gram/l or 15 g/l of $SiO_2$ do not give any advantageous effect. U.S. Pat. No. 4,147,839 (Diamond Shamrock Corp.) granted on 3 Apr. 1979, claims the use of a 45% KOH electrolyte containing 54 g/l of potassium silicate characterised by a 1:2.2 ratio of $K_2O$ and $SiO_2$, thus equivalent to 37 g/l of $SiO_2$. Here, the area of application is very special. This patent U.S. Pat. No. 4,147,839 is applied to a negative zinc electrode made of a layer of active metal suspended in an electrolyte and a current collector, the principle sought is to allow total dissolution of all reaction products while discharging and a reverse action during recharging. The advantage of silicates is once again to increase dissolution of the reaction products, as also sought in patent FR 2 214 977.

Finally, the effect of silicates on corrosion of zinc has been studied by J.Y Huot (J. Appl. Electrochem. 22, 1992, 443). He shows that silicates, at a rate of 2 g/l of silica, slow down the corrosion of zinc powder in an alkaline medium, but that this effect is less when zincate is present in the solution.

Apart from this search for reduction in corrosion of zinc in an alkaline medium described by J. Y. Huot, all the documents analysed relating to the use of silicates show that their action is aimed at increasing the solubility of zinc, while noting a negative effect of increased passivation, particularly for high concentrations of silicates.

An increase in the solubility of zinc can be logically sought for systems with circulation of electrolyte or with a zinc electrode dispersed in a circulating electrolyte.

However, it does not logically appear appropriate to use silicates for any secondary cell with a more or less restricted volume of electrolyte and a massive anode. In fact, in such configurations, if there has been significant dissolution of zinc while discharging, then during successive recharges this increasingly results in redistribution of zinc between the anodes and within each of them, and constitution of densification zones within them. These developments, which gradually reduce the useful capacity of the anodes, also accelerate the imbalance in the state of charge of the cathodes.

These imbalances have been highlighted, particularly in nickel-zinc batteries, by the work of Z. P. Arkhangel'skaya et al. (Russ. J. Appl. Chem. 70, no. 1 1997, 68).

On the contrary, the purpose of these cell configurations is rather to reduce the solubility of zinc in order to limit its redistribution during recharging, as claimed for example in the patent application U.S. Pat. No. 5,556,720 (Charkey) published on 17 Sept. 1996.

Therefore, the analysis of the state-of-the-art documents, patents and studies describing alkaline batteries in which silicates are used highlights the use of the ability of silicates to increase the solubility of zinc in an alkaline medium. None of these documents mention or seek an improvement in the stability and cycling lifespan of the battery that would result from a combined action with a conductive ceramic, preferably titanium nitride, to limit the drying out of the battery and passivation of the zinc electrodes.

SUMMARY STATEMENT OF THE INVENTION

The aim was to search for ways that would prevent the batteries from drying out and the zinc electrodes from becoming denser. For this purpose, various parameters were studied that influence the stability of the zinc electrode while the battery is being recharged.

It was thus shown that 2 specific parameters had an advantageous influence: addition of some conductive ceramics, especially TiN, to the zinc anode, and the addition of silicates to the electrolyte, see FIG. 3, elements 1 and 2 respectively. Separate addition of these components gives interesting results, but the addition of ceramic, which is described in patent FR 2 788 887, is more widely advantageous than the isolated addition of silicates to the electrolyte. Each of these 2 components, conductive ceramic and silicates, make it possible to suppress the formation of zinc dendrites and decrease densification of the zinc electrodes. The drop in capacity finally observed is correlated to different mechanisms, drying out of the battery for the conductive ceramics and passivation of the zinc electrodes for the silicates, here the silicates added are 45 g/l equivalent of $SiO_2$, well above the 30 g/l reported by P. C. Foller.

The experimental work carried out has shown that the concomitant use of these two components is clearly more advantageous than if each of them were to act in isolation. The mechanism at the origin of this result is also new since it was correlated to an improvement in the recombination of oxygen on the obtained conductive ceramic which is not limited by passivation of the zinc electrodes: i.e. we achieve dual decrease on the one hand of the negative effects and on the other hand of the limits of the positive action, than with each component used separately.

The invention therefore relates to rechargeable alkaline electrochemical cells with zinc anode comprising conductive ceramics, wherein the alkaline aqueous electrolyte, having molarity between 4 M and 15 M of hydroxyl anions, contains silicates in concentrations expressed as silica ($SiO_2$) of between about 0.15 g/l and 80 g/l.

To be more specific, the invention relates to an electrochemical cell in accordance with the following point 1:

1.—A secondary electrochemical cell with a zinc electrode, characterised in that it comprises:

a) an electrolyte which is an alkaline aqueous solution whose molarity is between 4 M and 15 M hydroxyl anions, comprising soluble silicates whose concentration expressed as silica ($SiO_2$) is between 0.15 g/l and 80 g/l; and b) a zinc electrode containing a conductive ceramic at least partly consisting of hafnium nitride and/or carbide and/or magnesium carbide and/or nitride and/or silicide and/or niobium carbide and/or nitride and/or titanium carbide and/or nitride and/or silicide and/or vanadium nitride and/or of double carbides and/or nitrides of any two metals selected among hafnium, magnesium, niobium, titanium and Advantageous characteristics of the electrochemical cell of the aforementioned point 1 are indicated in the following points 2 to 8:

2.—An electrochemical cell according to point 1, in which the conductive ceramic contained in the zinc electrode comprises titanium nitride.

3.—A secondary electrochemical cell according to point 1 or 2, in which the molarity of the alkaline solution is between 7 and 13 M.

4.—A secondary electrochemical cell according to one of the points 1 to 3, in which the concentration of silicates in the electrolyte, expressed as silica, is between 20 g/l and 60 g/l.

5.—A secondary electrochemical cell according to one of the points 1 to 4, in which the alkalinity of the electrolyte solution is provided by lithium, sodium or potassium hydroxides, alone or in a mixture.

6.—A secondary electrochemical cell according to one of the points 1 to 5, in which the silicates are provided by silica, fumed silica, silica fume, potassium or sodium silicates, potassium and sodium di-silicates, potassium and sodium meta-silicates, potassium tetra-silicate and sodium ortho-silicate, where these silicates are used alone or as a mixture.

7.—A secondary electrochemical cell according to one of the points 1 to 6, in which the electrolyte contains zincates in addition.

8.—A secondary electrochemical cell according to one of points 1 to 7, in which the electrolyte contains borates, phosphates and/or fluorides in addition.

More features and advantages of the invention will now be described in detail in the following statement given with reference to the attached figures, which schematically represent:

FIG. 3: measured capacity curves during discharge of the 8 Ah NiZn elements during cycling (8 A charge in 1 hour, discharge 8 A, 1 V, 100% depth of discharge).

1: anode with TiN and silicate-free electrolyte,
2: anode without TiN and electrolyte with silicate,
3: anode with $TiO_2$ and electrolyte with silicate,
4: anode with TiN and electrolyte with silicate;

FIG. 7: measured capacity curves during discharge of the 8 Ah NiZn elements during cycling (8 A charge in 1 hour, discharge 8 A, 1 V, 100% depth of discharge).

8: anode with TiN and silicate-free electrolyte,
9: anode with TiN and electrolyte with 0.45 M silicate,
10: anode with TiN and electrolyte with 0.85 M silicate.

DETAILED DESCRIPTION OF THE INVENTION

The zinc anode battery is made according to the methods known to the person skilled in the art. The electrodes are in the form of plates, consisting of a current collector and an active mass. The active mass can incorporate compounds that are not involved in the electrochemical reaction, but will, for example, perform an electronic conduction function or form a mechanical bond between the active substance and the collector, or carry out a retention function of a product of the electrochemical reaction.

In the case of the zinc anode, in addition to polymers such as PTFE, polyethylene glycol, polyvinyl alcohol, styrene-butadiene rubber, carboxymethyl cellulose, etc., which act as a binder for the electrode constituents, calcium hydroxide can be used to limit the formation of soluble zincates, as well as conductive ceramics as described in patent FR 2 788 887.

A separator isolates the anode and cathode compartments: it is a felt, a porous or ion-exchange membrane, felt and porous membrane can be combined.

Depending on the manufacturing method, the zinc anode battery may be in the form of a prism, cylinder or in the form of a filter press cell if the battery is of the bipolar type.

The present invention is in particular, and without limitation, applicable to the manufacture of a nickel-zinc battery designed according to the main characteristics described below.

In accordance with a preferred method of manufacture, a nickel-zinc battery is produced by combining a plasticized type nickel electrode and a zinc electrode also containing an organic binder.

1) Nickel Electrode

The nickel electrode can be advantageously produced by using a very fine-pored nickel metal foam. Some of these foams are referred to as "battery grade". Such foams are supplied by, for example, Sumitomo Electric (Japan) and Corun (China). The foam thickness is chosen according to the desired surface capacity of the nickel electrode: it is generally between 1.2 and 2 mm, but it can be rolled to precisely adjust the thickness to the desired surface capacity.

The active material consists of nickel hydroxide which preferably contains co-precipitated zinc and cobalt. The particles are preferably spherical or spheroidal in shape to increase the volume capacity. They can be coated with cobalt oxide and cobalt hydroxide which, while the battery is being made, are converted into conductive cobalt oxy-hydroxide (Oshitani et al. J. Electrochem. Soc. 1989 136, 6, 1590).

One can also add conductive additives (fibres, metal powders) to the nickel hydroxide powder.

A paste is prepared by mixing the constituents described above with permuted water to which carboxymethyl cellulose has been added. A polymeric binder, such as PTFE, may be added at this stage of manufacture as a suspension, or later after filling or covering the manifold, especially nickel foam, with the active paste by dipping it into the suspension.

The nickel foam is filled for laboratory purpose using a doctor blade that is used to penetrate the paste into the thickness of the substrate, and for industrial purpose by injecting the paste under pressure into the foam.

After drying, the electrode is compressed to ensure cohesion between the manifold, active material and additives and cut to the desired dimensions.

2) Zinc Electrode

The zinc electrode collector can be in the form of perforated metal strip, woven wire cloth, expanded metal strip or metal foam. Copper may be preferred due to its conductivity, but must be covered with a protective metal: zinc, tin, or alloy.

The zinc electrode is manufactured by first preparing a paste made of zinc oxide and various additives:
- electronic conductors: metallic zinc, carbon, copper, conductive ceramics . . . , in the form of powders or filaments.
- anti-corrosion agents: indium, bismuth, etc.
- compounds that react with zincates: calcium hydroxide, barium hydroxide, etc.

The liquid phase is permuted water or alcohol, to which carboxymethyl cellulose has been added as a binder and thickener. Other binders can be added such as those mentioned in patent EP 1 715 536.

Based on the technique chosen, it is possible to prepare a high-viscosity paste which can be applied by pressure to both sides of the metal support to form a "sandwich" structure, or to prepare a medium-viscosity paste in which the collector is immersed and then taken out while removing the excess paste to adjust the thickness of the electrode using a doctor blade, an operation which is followed by drying. Finally, it is possible to use a dry powder mixed with a binder and compress it on the metal support to form the electrode.

3) The Electrolyte

The electrolyte used, to which the silicates are added, is preferably a concentrated alkaline solution whose molarity is between 4 and 12 M (4 and 12 mol/l) of hydroxyl anions. The alkalinity is provided by potassium, sodium and lithium hydroxides, used individually or as a mixture.

The quantity of silicates added to the electrolyte, expressed as mass of silica per litre, is between 0.15 and 80 g/l and preferably between 20 and 60 g/l. The electrolyte may also contain zincates in varying proportions.

The silicates are in particular provided by silica, fumed silica, silica fume or potassium and sodium silicates such as potassium and sodium di-silicates, potassium and sodium meta-silicates, potassium tetra-silicate and sodium ortho-silicate. These silicates can be used by themselves or as mixtures.

The electrolyte may also contain borates, phosphates, and fluorides, used by themselves or in mixtures, as described for example in patent U.S. Pat. No. 5,215,836.

Oxygen Recombination Processes

In order to explain the approach that has been followed to arrive at the present invention, first the analysis of the loss of mass and the recombination of oxygen of NiZn elements will be described. Charging of the nickel electrodes is characterised by a parasitic oxygen change reaction, which takes place a little before reaching full charge of the nickel electrodes. In order to limit the drying out of the batteries resulting from expulsion of oxygen from the battery via the sealing valve, it is desirable to recombine the oxygen inside the battery in order to limit the drop in capacity. Oxygen can be recombined on the surface of the zinc electrode in two ways:

(1) chemical oxidation expressed by the reaction $2Zn+O_2+2H_2O \rightarrow 2Zn(OH)_2$, and (2) catalytic reduction on a conductive area, such as zinc metal or titanium nitride, expressed by the reactions:

$O_2+2H_2O+4e- \rightarrow 4OH-$ and/or $O_2+H_2O+2e- \rightarrow HO_2^- + OH^-$ (while charging only).

In order for these two reaction mechanisms to be efficient, they require triple phase contact points, solid-liquid-gas, where gas is the oxygen on the surface of the zinc electrodes. It is therefore essential to access oxygen on the surface of the zinc electrodes to ensure recombination.

Different barriers can limit access of oxygen at the surface of the zinc anodes. Classified from the most restrictive to the least restrictive, their particularity is that they are of different physical states: liquid phase is the electrolyte at this surface;

solid phase is the porous separator placed on the surface of the zinc electrode; gaseous phase consists of the hydrogen generated on the surface of the said anode. This evolution of hydrogen represents a indirect hindrance by increasing the amount of electrolyte at the interface when the electrolyte level is low.

Two NiZn elements A and B with a nominal capacity of 4.6 Ah are made according to the general description given above and using identical electrode and electrolyte compositions. The electrolyte used is a concentrated alkaline solution of KOH with a molarity of 10 M hydroxyl anions without the addition of silicates.

Titanium nitride is homogeneously introduced into the active mass of the zinc anode for element A. For element B, the same amount of TiN is preferentially deposited on the surface of the zinc electrodes. The elements are sealed, fitted with a valve which opens at pressures above 2 bar.

Figure 1:
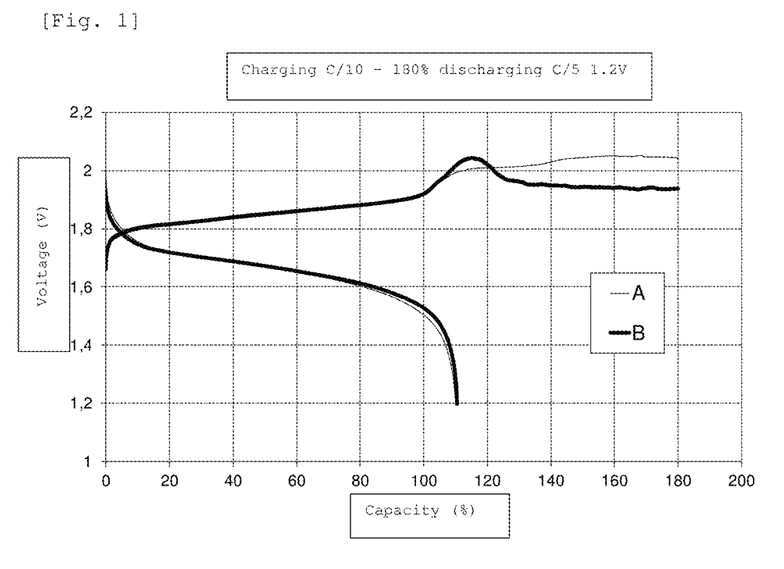
FIG. 1: charging and discharging voltage of 4.6 Ah NiZn elements as a function of the percentage of the nominal capacity C=4.6 Ah of elements A and B.

Elements A and B are charged at C/10 between 100% and 180% state of charge and then discharged at C/5 with a cut-off voltage of 1.2 V, the example at 180% charge is given in Table 1 and FIG. 1. Mass losses ($\Delta M$) of the elements are measured and a gas recombination rate (GCR) is calculated by converting the ampere-hour difference between the charge and the discharge into a mass of potentially lost water, Table 1 given below.

For element A, the gas recombination rate decreases as the state of charge increases. This behaviour is not verified for element B, which is characterised by an overall mass loss that is twice as low and a gas recombination rate that increases at 180% state of charge compared to that calculated at 140%.

This result corresponds to an increased catalytic activity of TiN with respect to oxygen, according to process (2), which we have sought to demonstrate here by showing accentuation of the phenomenon when the TiN is mainly located on the surface of the anode, therefore in greater quantity on its surface, compared with the case where the same overall quantity is distributed throughout the anode volume.

The present invention is intended to enhance the catalytic activity of TiN on the recombination of oxygen in order to repel passivation mechanisms of the negative electrode and the drying mechanisms of the zinc anode elements.

TABLE 1

| Element NiZn | Charge (%) | Charge (Ah) | Discharge (Ah) | Disch. (%) | $\Delta M$ (g) | TRG (%) |
|---|---|---|---|---|---|---|
| A | 100% | 4.603 | 4.497 | 97.7% | 0.01 | 72% |
| (TiN in the | 120% | 5.524 | 4.953 | 107.7% | 0.12 | 38% |
| thickness) | 140% | 6.444 | 4.999 | 108.6% | 0.37 | 24% |
|  | 180% | 8.285 | 5.066 | 110.1% | 0.87 | 20% |
|  |  |  |  | $\Sigma \Delta M$: | 1.37 |  |
| B | 100% | 4 601 | 4.469 | 97.1% | 0.00 | 100% |
| (TiN on | 120% | 5.524 | 4.992 | 108.5% | 0.05 | 72% |
| surfaces) | 140% | 6.444 | 5.100 | 110.8% | 0.24 | 47% |
|  | 180% | 8.282 | 5.085 | 110.5% | 0.33 | 69% |
|  |  |  |  | $\Sigma \Delta M$: | 0.62 |  |

Seeking to define new methods of realisation that can resist passivation mechanism of the negative electrode and drying mechanism of the cell according to the present invention, its author carried out a comparative experiment conducted on identical 3 Ah NiZn C and D elements—excluding the electrolyte—realised according to the general description previously provided. Their zinc anodes contain TiN.

The electrolyte used is a concentrated alkaline solution whose molarity is 10 M hydroxyl anions for element C. The electrolyte is modified for element D with an addition of 0.82 M silicates, provided by silica.

Internal pressure of the elements is measured using a 0-10 bar pressure sensor and the elements are fitted with a safety valve which opens at pressures above approx. 0.85 bar.

The 2 elements are initially formed by 3 cycles with charges at C/10 regime for 12 hours and discharges at C/5 regime up to a discharge cut-off voltage of 1.2V.

Figure 2:
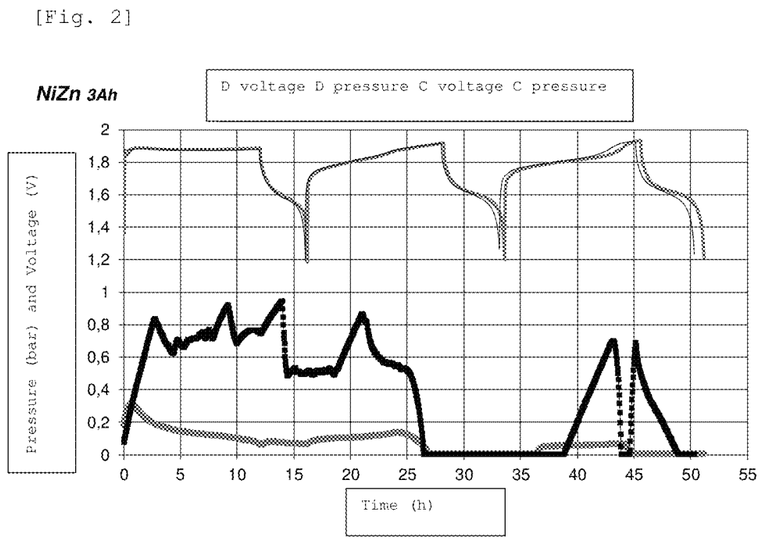
FIG. 2: voltage and pressure of the 3 Ah NiZn elements C and D with or without silicates for 3 training cycles.

Voltage and pressure of the C and D elements are given for the 3 cycles in FIG. 2.

Pressure measurement of element D containing the silicate electrolyte is characterised by the absence of valve openings. Conversely, the internal pressure of element C, not containing silicate additions in the electrolyte, is characterised by valve openings, particularly in regions of the start of charge involving preferably an evolution of hydrogen at the zinc electrode. This result shows that the presence of silicates in the electrolyte reduces the formation of hydrogen and improves the recombination of oxygen.

Without silicates, the low hydrogen overvoltage of TiN generates a limited production of hydrogen at the heart of the porous anode. The electrolyte contained in the porosity of the zinc electrodes is partially forced towards the electrode interface. Thickness of the electrolyte film at the electrode interface then increases, limiting the access of oxygen to the catalytic recombination areas of the TiN. Thus, recombination preferentially takes place on the Zn metal through the chemical recombination process (1), resulting in the drying and passivation phenomena by the formation of $Zn(OH)_2$, leading to a progressive drop in capacity.

With silicates, the pressure measurement shows significant reduction in the evolution of hydrogen. Analysis of the phenomenon is used to conceive the hypothesis, such that it does not limit the scope of the invention stated here, according to which, by getting deposited on the zinc electrode's surface, the silicates decouple the TiN and the Zn metal, forming an insulating interface between the two, which makes it possible to reduce the evolution of hydrogen. Oxygen's access to TiN is thus improved, which enables recombination to take place preferentially according to the catalytic process (2), which does not result in the drying and passivation phenomena.

In order to continue and illustrate highlighting the operation and definition of this invention, the NiZn elements 1, 2, 3 and 4 with a nominal 8 Ah capacity are identically produced, according to the general description given above.

The elements are mounted with a 0.2 bar low pressure valve. The nickel hydroxide used for the cathodes of elements 1 to 4 contains 5% cobalt. The electrolyte used is a concentrated alkaline solution with a molarity of 10M hydroxyl anions for element 1. The electrolyte is modified for elements 2, 3 and 4 with an addition of silicates. The parameters that differentiate elements 1 to 4 are summarised in Table 2, below.

TABLE 2

Characteristics of NiZn batteries, nominal capacity
8 Ah, charge 8 A 1 h, 100% discharge 8 A 1 V cycles.

| Element (battery) | TiN in the zinc anodes | Silicates in the electrolyte | Co content in Ni(OH)$_2$ of the cathodes | Number of cycles at 90% residual capacity | Max. number of cycles |
|---|---|---|---|---|---|
| 5 | No | 0.45M | 8% | 500 | 500 |
| 2 | No | 0.75M | 5% | 770 | 830 |
| 3 | No (with TiO$_2$) | 0.75M | 5% | 770 | 900 |
| 1 | Yes | No | 5% | 1.120 | 1.330 |
| 6 | Yes | No | 8% | 1.200 | 1.300 |
| 8 | Yes | No | 8% | 1.120 | 1.300 |
| 4 | Yes | 0.45M | 5% | 1.380 | 1.885 |
| 7 | Yes | 0.45M | 8% | 1.700 | >1.840 |
| 9 | Yes | 0.45M | 8% | 1.940 | 2.640 |
| 10 | Yes | 0.85M | 8% | 1.740 | 2.680 |

In element 3, titanium nitride is replaced by a titanium oxide compound.

The batteries have been cycled at a constant current of 8 A, equivalent to the C regime, with a charge of one hour and a discharge that ends when the voltage reaches 1V.

Figure 4:
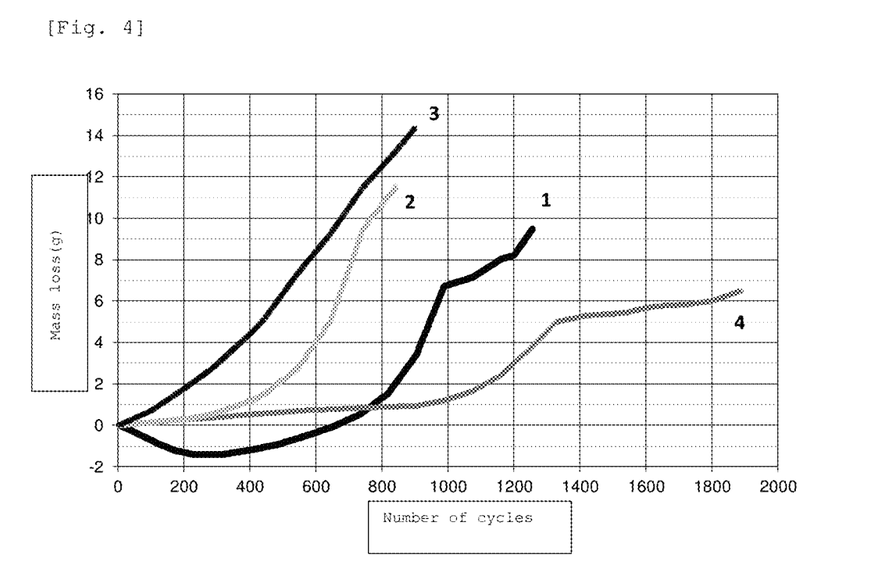
FIG. 4: cumulative mass losses during cycling of the 8 Ah NiZn elements in FIG. 3, 1: anode with TiN and silicate-free electrolyte,
2: anode without TiN and electrolyte with silicate,
3: anode with $TiO_2$ and electrolyte with silicate,
4: anode with TiN and electrolyte with silicate.

The discharged capacities and accumulated mass losses as a function of the number of cycles for batteries 1 to 4 are compared in FIGS. 3 and 4 respectively.

It can be seen that the stability of the capacity of the batteries improves in the following sequence:
  Addition of silicate alone, batteries 2 and 3 (TiO$_2$ does not have the same effect as TiN),
  Addition of TiN alone, battery 1
  Addition of TiN and silicate, battery 4.

The results are shown in Table 2. It can be seen that 90% of the initial capacity is maintained after 770, 770, 1,120 and 1,380 cycles for elements 2, 3, 1 and 4 respectively. After 90% of the residual capacity is passed, the capacities of the batteries drop rapidly except for 4 (TiN and silicates). Battery 4 (TiN and silicates) retains more than 75% of its initial capacity after 1,885 cycles, i.e. an improvement of 50% compared to battery 1, which retains 75% of its initial capacity after 1,260 cycles.

Mass losses of batteries 2 (silicates without TiN) and 3 (silicates and TiO$_2$) are the highest, suggesting insufficient oxygen recombination to limit the drying out of the batteries. Here, passivation of the zinc electrodes can be seen in accordance with the article by P. C. Foller indicating that for silica additions greater than 28-30 g/l, a silica deposit passivates the zinc surface. This deposit limits the recombination power of the zinc electrodes.

In the context of the present invention, the author has also shown that the complexes formed between silicate and zincate ions in an alkaline medium, in particular even within porous zinc anodes, may have a stability that makes it possible to measure lower mobility, due to an increase in the steric effects of the zincates complexed by the silicates, than that of the smaller zincate ions by themselves. The limitation of mobility of the zincate ions by complexing with silicate ions is a parameter that can help to reduce the redistribution and densification phenomenon of zinc in the anodes.

The formation of complexes between silicate and zincate ions in an alkaline medium, mentioned by several authors, has been described by Michel R. Anseau et al. (Inorg. Chem. 44, 8023-8032, 2005) in strongly alkaline media: zincates, in potash or soda solutions of 14 to 15 mol/l, react with monomeric, dimeric and cyclo-trimeric silicates to form very stable compounds.

The mass losses of batteries 1 and 4 (with TiN) are significantly lower than those of batteries 2 and 3. It is interesting to note a different progressivity between these two batteries 1 (with TiN) and 4 (with TiN and silicates):
  from 0 to 900 cycles the mass loss increases very moderately and linearly in case of battery 4, whereas it accelerates from 300 cycles onwards in case of battery 1. This result is in line with an improvement in stability due to a decrease in densification of the zinc electrodes, as expected by the complexation of zincates with the silicates.
  between 900 and 1,260 for battery 1 and between 1,000 and 1,300 for battery 4, the mass loss increases sharply due to an increasingly significant evolution of oxygen at the end of charge.
  from 1,200 cycles onwards in case of battery 1, the mass loss becomes too great, resulting in a rapid drop in capacity due to the drying out of the cell and passivation of the electrodes.
  battery 4 shows a singular behaviour, characterised by a moderate overall loss of mass, with evolution of loss again decreasing beyond 1,300 cycles, in accordance with effective recombination of oxygen that sustainably limits its drying out and passivation of the electrodes.

Thus, it can be seen that simple addition of titanium nitride to the anode, battery 1, or of silicates to the electrolyte, battery 2, provides satisfactory response to the stability of the zinc electrode, with suppression of dendritic formation and reduction in the densification of the zinc electrode.

Addition of titanium nitride is, however, considerably more effective than the addition of silicates to the electrolyte. But this is a very significant improvement in operation that is measured during concomitant addition of titanium nitride to the zinc electrode and of silicates to the electrolyte, (battery 4), which corresponds to a greatly improved oxygen recombination power at the zinc electrodes, resisting the system drying out and zinc electrode passivation phenomena. Silicates provide a hitherto unidentified strengthening action of the catalytic reduction power of oxygen of a conductive ceramic such as titanium nitride.

In the following comparison, NiZn 5, 6 and 7 batteries with a nominal 8 Ah capacity are made in the same way, following the general description given above.

The elements are mounted with a 0.2 bar low pressure valve. The nickel hydroxide used for the cathodes of elements 5 to 7 contains 8% cobalt. Increasing the amount of cobalt increases the conductivity of the nickel hydroxide. The nickel electrode's charge is thus more efficient, with a decrease in the evolution of oxygen and thus a moderation of the cumulative mass losses.

The electrolyte used is a concentrated alkaline solution with a molarity of 10M hydroxyl anions for element 6. The electrolyte is modified for elements 5 and 7 with significant addition of silicates. The anodes of element 5 do not contain TiN.

The parameters that differentiate elements 5 to 7 are summarised in Table 2 above.

The batteries 5 to 7 have been cycled at a constant current of 8A, equivalent to the C regime, with a charge of one hour and a discharge that ends when the voltage reaches 1V.

Figure 5:
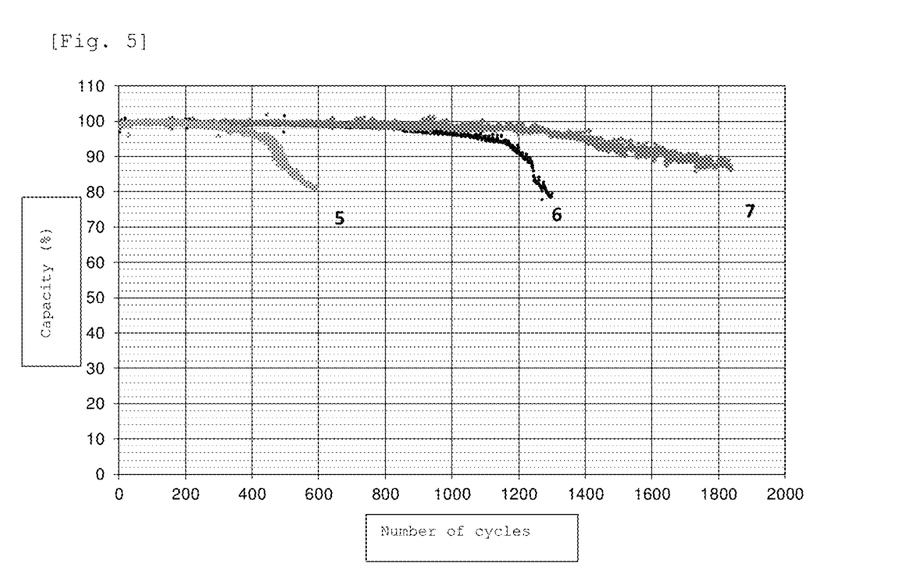
FIG. 5: measured capacity curves during discharge of the 8 Ah NiZn elements during cycling (8 A charge in 1 hour, discharge 8 A, 1V, 100% depth of discharge), 5: anode without TiN and electrolyte with silicate,
6: anode with TiN and silicate-free electrolyte,
7: anode with TiN and electrolyte with silicate.
Figure 6:
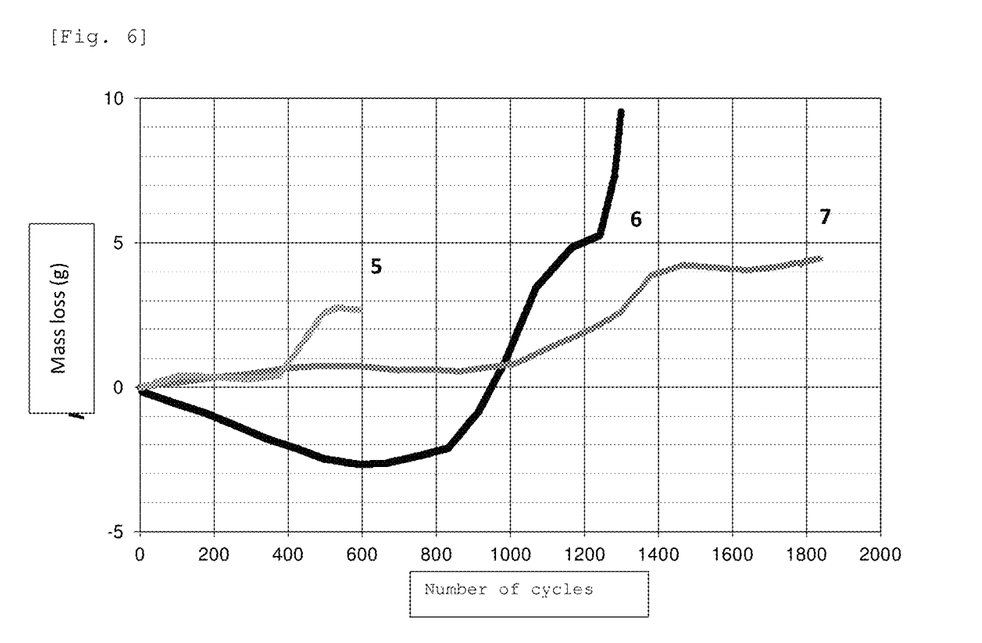
FIG. 6: cumulative mass losses during cycling of the 8 Ah NiZn elements in FIG. 5, 5: anode without TiN and electrolyte with silicate,
6: anode with TiN and silicate-free electrolyte,
7: anode with TiN and electrolyte with silicate.

The discharged capacities and accumulated mass losses as a function of the number of cycles for batteries 5 to 7 are compared in FIGS. 5 and 6 respectively.

The results are shown in Table 2 above.

Following the sequence without TiN and with silicate, battery 5, then with TiN and without silicate, battery 6, and finally with TiN and silicate, battery 7, the stability of the capacity of the batteries improves with a residual capacity at 90% of their initial capacity after 500, 1,200 and 1,700 cycles respectively, see Table 2. The number of cycles is lower for battery 5 (0.45M, i.e. 27 g/l of $SiO_2$) than for batteries 2 and 3 (0.75M, i.e. 45 g/l of $SiO_2$) suggesting a beneficial effect when adding silicates higher than 30 g/l expressed as $SiO_2$, contrary to what is indicated by the state of the art which announces a drop in capacity by passivation following the precipitation of $SiO_2$ or because of an excessively viscous electrolyte (article P. C. Foller).

At 90% of the initial capacity, battery 7 shows an increase in the capacity's stability by 42% compared to battery 6. The evolution of mass losses of batteries 6 and 7 are similar to those of batteries 1 and 4, confirming the singular character of the oxygen's recombination power within batteries that combine titanium nitride in the zinc electrode and the addition of silicate in the electrolyte.

Finally, NiZn elements 8, 9, and 10 with a nominal 8 Ah capacity are made in the same way, following the general description given above.

The elements are fitted with a 0.2 bar low-pressure valve. The nickel hydroxide used for the cathodes of elements 8 to 10 is the same as that of elements 5 to 7 above. Elements 8 to 10 have zinc electrodes containing titanium nitride.

Compared with elements 6 and 7, preparation of the active mass paste of the zinc electrode has been modified, without changing its chemical composition, by a procedure which increases the homogeneity of the constituents of this active mass.

The electrolyte used is a concentrated alkaline solution with a molarity of 10M hydroxyl anions for element 8. The electrolyte is modified for elements 9 and 10 with significant additions of silicates at 0.45M and 0.85M respectively.

The batteries 8 to 10 have been cycled at a constant current of 8 A, equivalent to the C regime, with a charge of one hour and a discharge that ends when the voltage reaches 1V.

Figure 7:
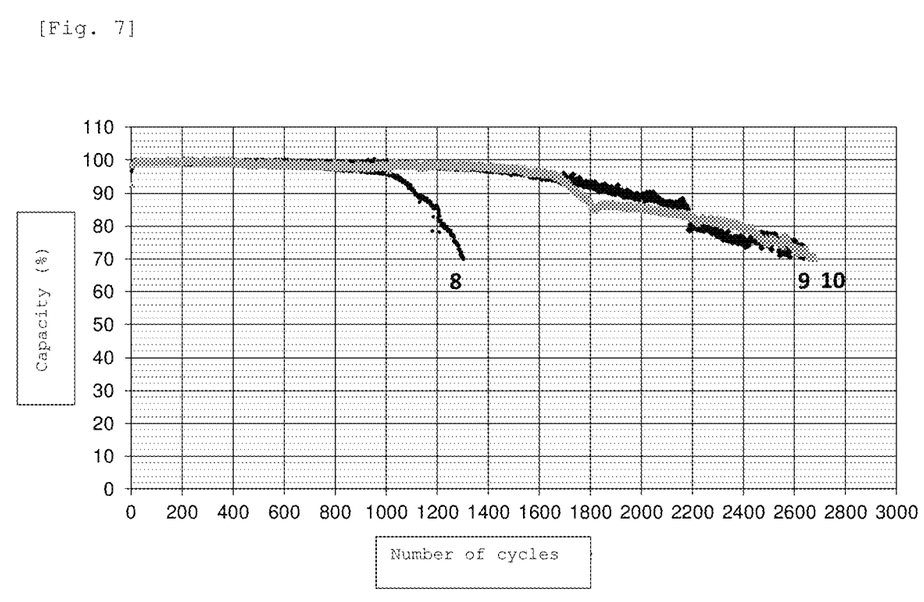

The discharged capacities as a function of the number of cycles performed for batteries 8 to 10 are compared in FIG. 7.

The results are also shown in Table 2 above.

Battery 8 (with TiN and without silicates) only delivers 70% of its initial capacity after 1,300 cycles, while battery 9 (with TiN and silicates at 0.45 M) still retains 70% of its initial capacity after 2,640 cycles, i.e. an increase of 103%. Battery 10 (with TiN and 0.85 M silicates) still retains 70% of its initial capacity after 2,680 cycles, i.e. an increase of 106% compared to battery 8.

These various results show that the effect obtained by using titanium nitride in the anode and silicates in the electrolyte at the same time can be spectacular, with an increase of more than 100% in the number of cycles.

They also reflect, as expected by the author of the present invention, a decrease in densification and changes in the shape of the zinc electrodes, linked to the formation of zincate-silicate complexes, which restricts their average free movement in the electrolyte, including within the anodes, and consequently reduces the redistribution of zinc.

In addition, the combination of a conductive ceramic, such as TiN, and silicates modifies the recombination power of the zinc electrodes with respect to oxygen, promoting the recombination of oxygen according to the catalytic process (2) described above.

The silicates no longer passivate the surface of the zinc electrodes, as observed in the absence of TiN. These phenomena limit the drying out of the batteries and significantly increase the cycle life.

These are therefore new effects measured when combining a conductive ceramic, such as TiN, in the zinc anode and silicates in the electrolyte that are the subject of the present invention.

Naturally, and as it largely results from what is given above, the invention is not limited to the particular methods of realisation that have been described by way of illustration and demonstration. The invention is not limited to the modes of realisation that have been provided, but embraces all the variants thereof.

The invention claimed is:

1. A secondary electrochemical cell comprising:
   a) a zinc negative electrode comprising a conductive ceramic selected from the group consisting of hafnium nitride, magnesium nitride, niobium nitride, titanium nitride, a vanadium nitride, hafnium carbide, magnesium carbide, niobium carbide, titanium carbide, magnesium silicide, titanium silicide, nitrides or carbides comprising two metals selected from the group consisting of hafnium, magnesium, niobium, titanium and vanadium, and combinations thereof; and
   b) an electrolyte comprising an alkaline aqueous solution whose molarity is between 4 M and 15 M hydroxyl anions provided by lithium hydroxide, sodium hydroxide, potassium hydroxide, or a combination thereof, said electrolyte comprising soluble silicates whose concentration expressed as silica ($SiO_2$) is between 0.15 g/l and 80 g/l and which are provided by silica, fumed silica, microsilica, potassium silicate ($K_2O_3Si$), sodium silicate ($Na_2O_3Si$), potassium disilicate ($K_2O_5Si_2$), sodium disilicate ($Na_2O_5Si_2$), potassium meta-silicate, sodium metasilicate, potassium tetrasilicate ($K_2Si_4O9$), sodium ortho-silicate ($Na_4O_4Si$), or a combination thereof.

2. The secondary electrochemical cell according to claim 1, wherein the conductive ceramic comprises titanium nitride.

3. The secondary electrochemical cell according to claim 1, wherein the molarity of the alkaline solution is between 7 M and 13 M.

4. The secondary electrochemical cell according to claim 1, wherein the concentration of silicates in the electrolyte, expressed as silica, is between 20 g/l and 60 g/l.

5. The secondary electrochemical cell according to claim 1, wherein the electrolyte further comprises zincates from the zinc negative electrode.

6. The secondary electrochemical cell according to claim 1, wherein the electrolyte further comprises borates, phosphates, fluorides, or a combination thereof.

7. The secondary electrochemical cell according to claim 1, wherein the conductive ceramic comprises titanium nitride and the molarity of the alkaline solution is between 7 M and 13 M.

8. The secondary electrochemical cell according to claim 1, wherein the conductive ceramic comprises titanium nitride, the molarity of the alkaline solution is between 7 M and 13 M and the concentration of silicates in the electrolyte, expressed as silica, is between 20 g/l and 60 g/l.

* * * * *